United States Patent
Gai

(10) Patent No.: US 6,588,354 B2
(45) Date of Patent: Jul. 8, 2003

(54) STEERING COMPARTMENT FOR BOATS WITH TILT TYPE AND HEIGHT ADJUSTABLE WHEEL

(75) Inventor: Giorgio Gai, Genoa (IT)

(73) Assignee: Ultraflex S.p.A., Casella (IT)

( * ) Notice: Subject to any disclaimer, the term of this patent is extended or adjusted under 35 U.S.C. 154(b) by 0 days.

(21) Appl. No.: 10/171,113

(22) Filed: Jun. 13, 2002

(65) Prior Publication Data

US 2003/0024457 A1 Feb. 6, 2003

(30) Foreign Application Priority Data

Aug. 1, 2001 (IT) ..................... GE2001A0064

(51) Int. Cl.$^7$ ............................................. B63H 25/00
(52) U.S. Cl. ................. 114/144 R; 74/493; 280/775
(58) Field of Search ................. 114/144 R; 74/492, 74/493, 540; 280/775, 777, 779

(56) References Cited

U.S. PATENT DOCUMENTS

| | | | | |
|---|---|---|---|---|
| 3,208,300 A | * | 9/1965 | Morse ..................... 114/144 R |
| 3,269,210 A |   | 8/1966 | Steele, Jr. et al. ............ 74/492 |
| 3,434,367 A | * | 3/1969 | Renneker et al. ............. 74/492 |
| 3,796,112 A | * | 3/1974 | Hoffman ....................... 74/493 |
| 4,531,921 A | * | 7/1985 | Teraura et al. .......... 114/144 R |
| 4,834,012 A |   | 5/1989 | Jorgensen ................... 114/162 |
| 4,834,658 A | * | 5/1989 | Kotani et al. ................... 439/8 |
| 5,136,894 A |   | 8/1992 | Carter et al. .................. 74/493 |
| 5,676,081 A | * | 10/1997 | Kobelt .................... 114/144 R |
| 5,836,211 A | * | 11/1998 | Ross et al. .................... 74/493 |
| 6,282,977 B1 | * | 9/2001 | Satoh et al. .................. 74/493 |
| 6,450,058 B2 | * | 9/2002 | Latz et al. ..................... 74/492 |

FOREIGN PATENT DOCUMENTS

| | | |
|---|---|---|
| EP | 0250375 | 12/1987 |
| FR | 925207 | 8/1947 |

\* cited by examiner

Primary Examiner—S. Joseph Morano
Assistant Examiner—Lars A. Olson
(74) Attorney, Agent, or Firm—Richard M. Goldberg

(57) ABSTRACT

Steering compartment equipment for boats fitted with a tilt and height adjustable steering wheel, includes a mobile tilt wheel shaft, a fixed control shaft, a universal joint permitting relative offset rotation between the mobile tilt wheel shaft and the fixed control shaft, a base plate secured to a boat dashboard, a gasket arrangement sealing the base plate and fixed control shaft relative to the dashboard, external coverings which protect the equipment against splashes, waves and bad weather, the external coverings including a fixed annular covering protecting parts secured to the dashboard, a mobile annular covering, and an intermediate toroid band shaped seal between the other two coverings and including a lower circular internal recess mounted on a peripheral upper zone of the fixed annular covering, and an inward bendable upper shaping which rests on an outside of a lower zone of the mobile annular covering.

12 Claims, 3 Drawing Sheets

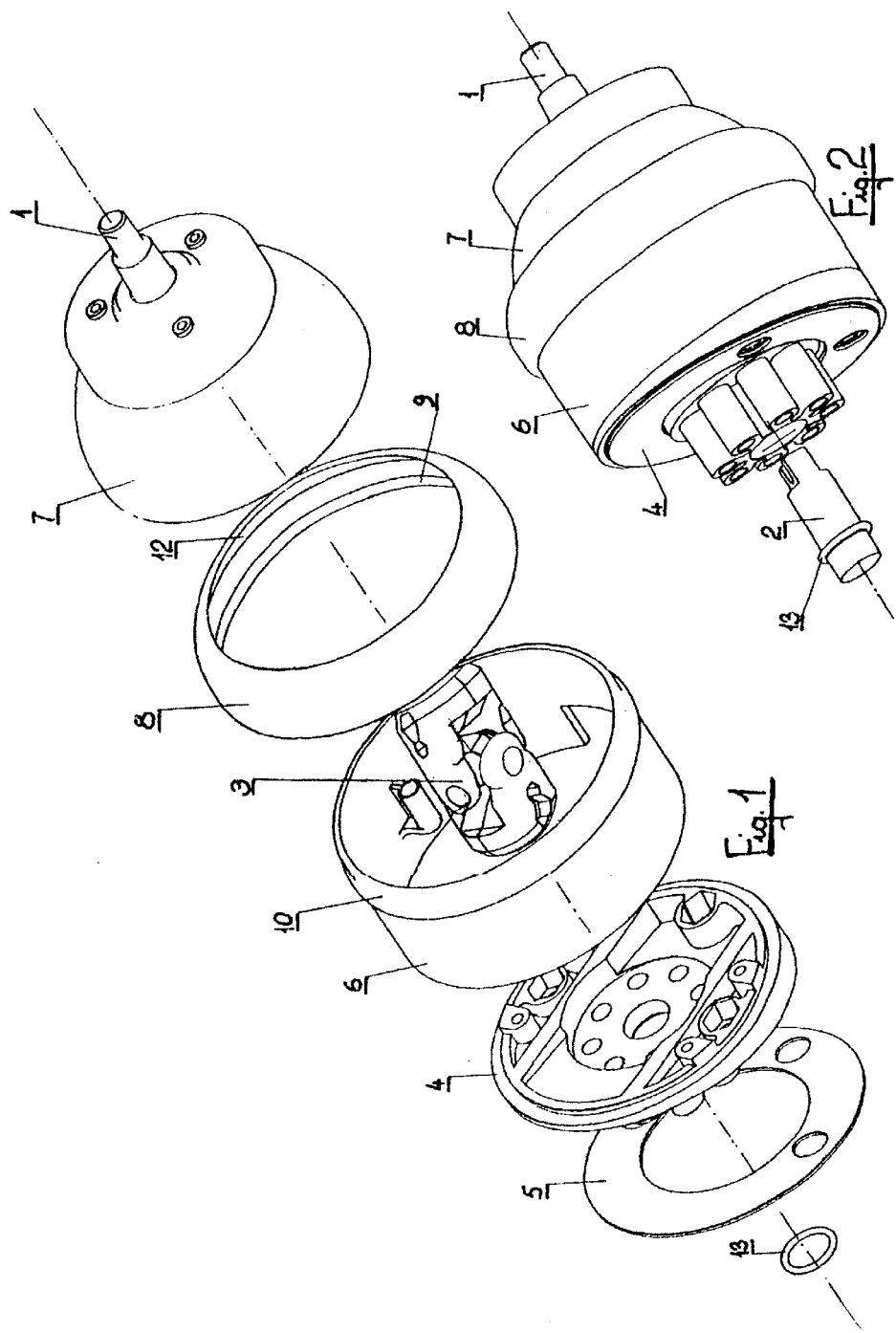

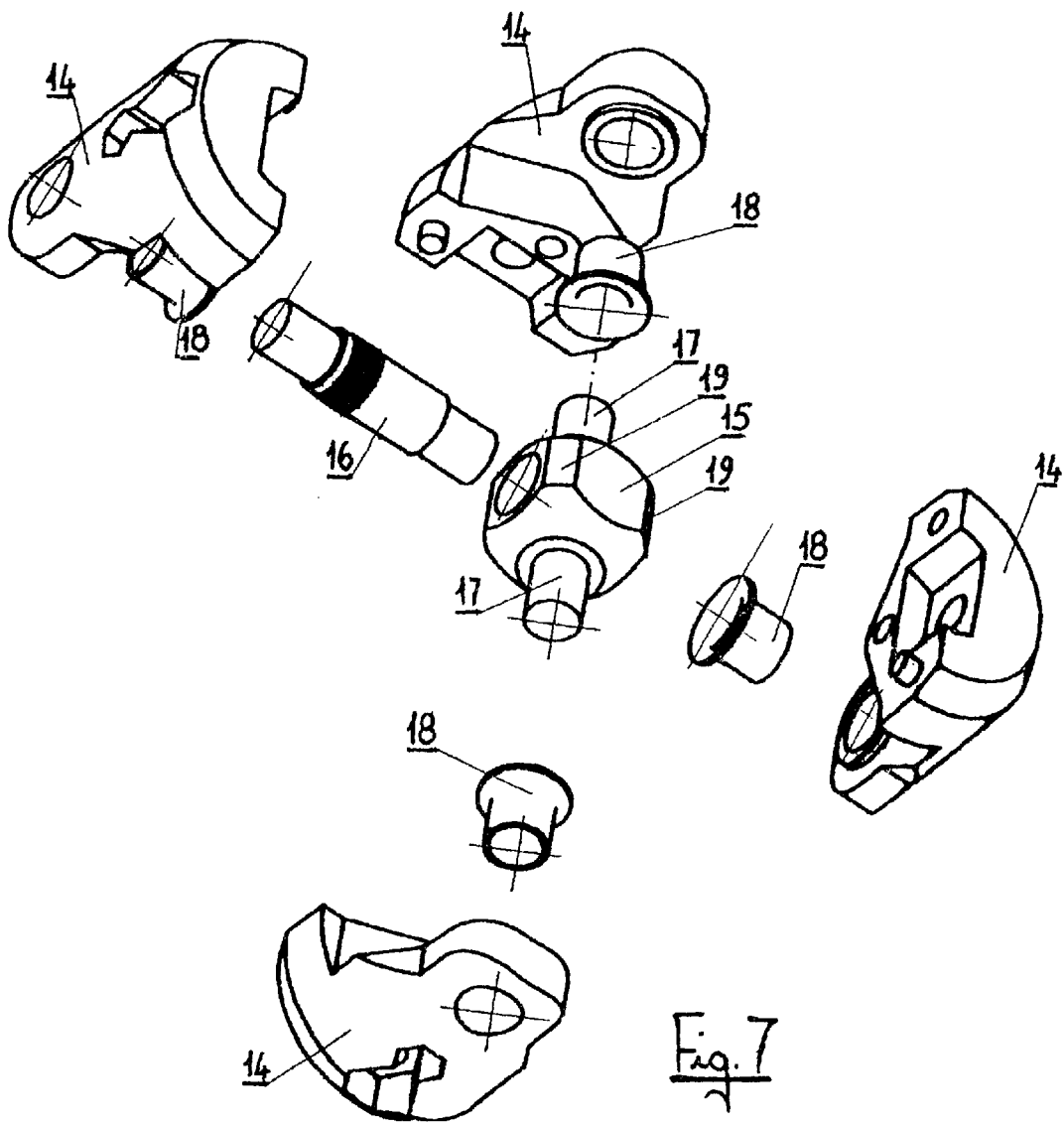

STEERING COMPARTMENT FOR BOATS WITH TILT TYPE AND HEIGHT ADJUSTABLE WHEEL

BACKGROUND OF THE INVENTION

This invention concerns steering compartment equipment for boats with an inclinable and height adjustable wheel, normally called a "Tilt wheel."

In the relative known solutions, this steering equipment features essentially a mobile support for the wheel shaft, supported by stirrups, the inclination of the mobile support and of the wheel shaft being blocked or released by a pawl meshing with a sector gear, features a universal joint connecting the mobile shaft with the fixed shaft of the steering, equipment and features protections, gaskets and seals to protect the equipment from splashes, waves and bad weather.

This equipment as nowadays known, has several drawbacks, the first of which is due to the fact that the equipment is secured to the dash board and passing through this dashboard reaches the steering compartment. It is therefore continuously exposed to splashes, waves and bad weather for which proper protections and seals are normally provided. At present, these protections and seals are not able to keep the system sufficiently dry, also because "tilt" wheels require the possibility to adjust these protections to the various tilting angles of the wheel.

A second drawback is due to the fact that the control shaft of the steering equipment, where it crosses the dashboard, is not adequately protected against leakage and splashes. Another drawback is caused by the fact that the mechanical strength of the universal joint located between the fixed control shaft of the steering equipment and the mobile wheel shaft now causes trouble and jamming, because of the sometimes even strong stresses and strains to which this universal joint is exposed and of the corrosive environment in which it is operating, especially during sometimes long tie-up periods.

SUMMARY OF THE INVENTION

This invention has the aim to minimise or better still to eliminate the above drawbacks. According to this invention, the external protection of the tilting device consists of three components, i.e. a first fixed covering protecting the parts of the device secured to the dashboard, a second mobile covering protecting the mobile part of the device, linked up to the wheel and a third component, i.e. a toroid or band shaped sealing ring connecting in an articulated way the above first and second protections.

The band shaped sealing ring has a particular configuration, which permits to bend outwards the edge facing the second mobile covering, on which this edge, after insertion, is fitted in normal sealing position.

After this definition of the, external protection, the steering equipment is installed by mounting this equipment on the dashboard and then fitting the first fixed covering, already provided with the outwards folded seal; the second mobile covering is then positioned, so that it penetrates the band shaped sealing ring which is finally elastically counter bent so that it is normally resting on the lower edge of this second mobile protection. In this way, the second protection is mobile with respect to the first protection and is capable to follow the movements of the tilt wheel while providing an excellent seal against water seepage in any and all tilt positions of the wheel.

According to this invention, an O-ring is sealing off the opening through which the control shaft of the steering equipment crosses the dashboard; this O-ring, together with the flange shaped packing placed between the dashboard and the fastening plate of the tilt wheel, further improves sealing conditions and makes the system, especially the dashboard, waterproof.

Furthermore, according to this invention, the universal joint, moving the steering equipment by means of the tilt wheel, is provided with four identical stirrups, which can therefore be indifferently assembled according to needs, and with a cross journal featuring a central body formed by a square parallelepipedon with chamfered edges so as to permit the maximum reciprocal inclination of the fixed and mobile shaft, without interference with the stirrups, while a steel bar with oversized cross section may be used at the same tire as cardan shaft. Four bushes with flanges in suitable material are provided on the head of the cross shafts, to prevent the steel of the cross journal from gripping on the aluminium stirrups when the equipment is not used for some time.

According to this invention, the steering equipment with tilt wheel is usually mounted on the dashboard with a flange featuring an inclined base, to allow for symmetrical installation with 180° rotation, with a pawl to block and release the tilt of the wheel in upper or lower position.

BRIEF DESCRIPTION OF THE DRAWINGS

The invention in question is illustrated for exemplification purpose, in the enclosed drawings, in which:

FIG. 1 shows a perspective top view of the exploded equipment forming the tilt wheel;

FIG. 2 shows a perspective view from below of the compacted equipment shown in FIG. 1.

FIG. 7 shows a perspective exploded view of the universal joint, mechanically connecting the fixed shaft of the steering gear to the mobile wheel shaft.

DETAILED DESCRIPTION

Figure 6:
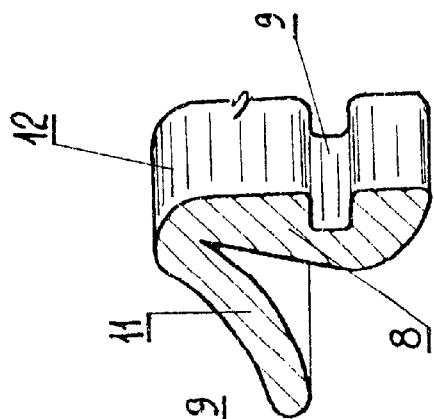
FIGS. 3, 4, 5 and 6 show a vertical section of a deformation sequence of the band shaped sealing ring fitted between the first fixed and the second mobile protection.

With reference to these drawings, 1 shows the wheel shaft connected to a support, adjustable by means of supporting stirrups, the tilt of this adjustable support and of the wheel shaft 1 being blocked or released by a tooth meshing with a sector gear. A universal joint 3 is mounted between the mobile wheel shaft 1 and the fixed shaft 2 of the steering equipment, to provide for offset rotation of the two shafts 1,2.

A base plate 4 is located in the lower zone of the equipment, this base plate 4 being secured, by means of a flanged gasket 5, to the dashboard of the boat.

This implementation, as described above, is generally known and therefore only the fixed shaft 2, the mobile shaft 1, the universal joint 3, the base plate 4 and the flanged gasket 5 are shown in the drawing.

As said before, this invention has the aim to improve the external protection of the equipment against splashes and water seepage and, according to this invention, this protection is provided by three components, i.e. by a first fixed annular covering 6 to protect the parts of the tilt wheel fastened to the dashboard, a second annular mobile covering 7, to protect the upper mobile part of the device and an intermediate toroid shaped seal 8, located between the aforesaid first and second covering 6,7. The first covering 6 and the second covering 7 are respectively mounted on the fixed and mobile parts of the equipment by means of fastening devices, such as bolts.

Figure 3:
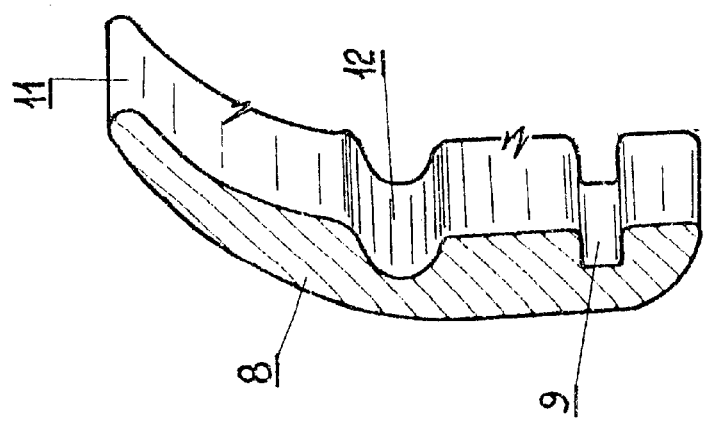

According to this invention and as illustrated in FIGS. 3, 4, 5 and 6, the toroid shaped seal 8 as illustrated in FIG. 3 features a lower internal circular recess 9 which is useful to fit the seal 8 on the upper zone of the fixed covering 6 by means of the matching peripheral shaping 10.

This band shaped seal 8, when in rest position, features at its upper end an inwards bent shaping 11, so that this shaping 11 will rest on the outer surface of the lower portion of the mobile covering 7. The protecting seal 8 is thus fixed onto the fixed covering 6 and is resting on the mobile covering 7, providing an efficient overall seal against splashes and water seepage while leaving the mobile covering 7 freely to follow the movements of the tilt wheel.

Figure 5:
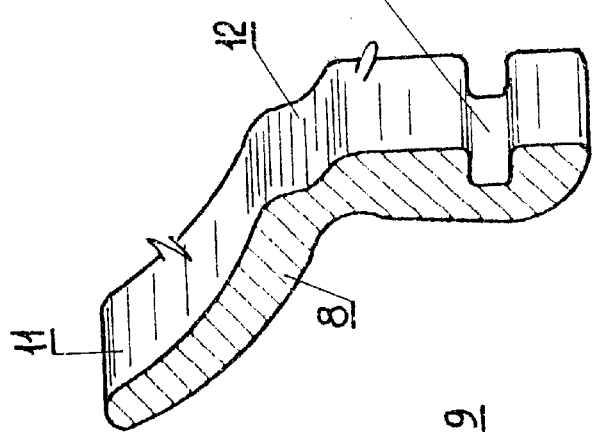
Figure 4:
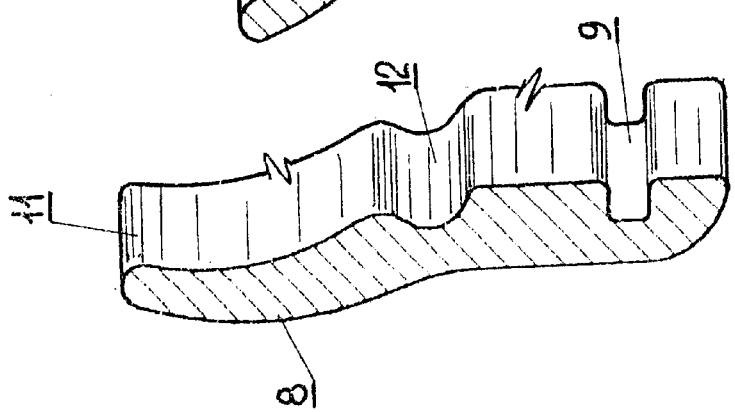

According to this invention, a recess 12 is preferably provided in the internal zone of the flanged seal 8 so as to form a weaker circular zone inside the body of the seal, to permit a simpler and easier elastic outwards bending of the upper shaping 11 as illustrated in its sequenced phases in FIGS. 4, 5, and 6.

By these artifices, the second mobile upper covering 7 can be easily inserted in the flanged seal 8 which would have prevented its entering if bent inwards. After assembly of the second mobile covering 7, the normal curvature position of the flange 8 is elastically restored.

According to this invention, a drop-tight O-ring 13 is fitted on the fixed gear shaft 2 passing through the dashboard, at its breakthrough level. This O-ring 13, together with the flanged gasket 5 inserted between the base plate 4 and the dashboard, considerably increases the possibility to protect the equipment and the dashboard from water infiltration and splashes.

Furthermore, according to this invention, the universal joint 3, acting as a mechanical sequence between the mobile shaft 1 of the tilt wheel and the fixed shaft 2 of the steering equipment, features four identical stirrups 14 which may be positioned anywhere inside the universal joint and also features a cross journal 15 provided with articulated shafts 16, 17, the ends of which, penetrating in the various stirrups 14, are protected by preferably flanged ferrules 18 in suitable material, which ferrules will prevent the steel of the cross journal from gripping on the aluminium stirrups when the system is not used for some time.

Furthermore, the cross journal 15, according to this invention, has the form of a square parallelepipedon with chamfered edges 19 and these chamfers 19 make it possible to obtain the maximum inclination between the fixed shaft 2 and the mobile shaft 1 without interfering with the stirrups 14.

Finally, according to this invention, the base plate 4 to be mounter on the dashboard, has a slanting form, with the possibility of an 180° opposed symmetrical installation, the grip and release pawl for inclination of the tilt wheel being located at the top or bottom.

What is claimed is:

1. Steering compartment equipment for boats which are fitted with a tilt type and height adjustable steering wheel, comprising:
    a mobile tilt wheel shaft,
    a locking and release pawl meshing with a sector gear for changing an inclination of the mobile tilt wheel shaft,
    a fixed control shaft,
    a universal joint which permits offset rotation of the mobile tilt wheel shaft and the fixed control shaft relative to each other and which functions as a mechanical sequencer between the mobile tilt wheel shaft and the fixed control shaft, the universal joint including:
        four identical stirrups positioned inside the universal joint,
        a cross journal having articulated shafts with ends that penetrate the stirrups, the cross journal formed as a substantially square parallelepiped with chamfered edges to permit inclination of the mobile tilt wheel shaft and the fixed control shaft relative to each other,
        flanged ferrules inserted in the stirrups with the articulated shafts inserted in the flanged ferrules to prevent gripping of the universal joint when not in use,
    a base plate for securement to a dashboard of the boat,
    a flanged base gasket for interposition between the base plate and the dashboard of the boat,
    an O-ring mounted on the fixed control shaft at a position where the fixed control shaft passes through the dashboard and which cooperates with the flanged base gasket, and
    external coverings which protect the equipment against splashes, waves and bad weather, the external coverings including:
        a first fixed annular covering which protects parts of the equipment which are secured to the dashboard,
        a second mobile annular covering which protects a mobile upper part of the equipment, and
        a third intermediate toroid band shaped seal located between the first fixed annular covering and the second mobile annular covering, the toroid band shaped seal including:
            a lower circular internal recess mounted on a peripheral upper zone portion of the first fixed annular covering, and
            an inwards bent upper shaping which rests on an outside of a lower zone of the second mobile annular covering, the upper shaping being outwardly elastically bendable to facilitate installation of the second mobile annular covering and inwardly elastically bendable to a rest position in sealing relation to the second mobile annular covering.

2. Steering compartment equipment according to claim 1, wherein the toroid band shaped seal includes an annular recess in an inner surface thereof for more easily bending the upper shaping.

3. Steering compartment equipment according to claim 1, wherein the base plate has an inclined configuration which permits installation in a first orientation and a second orientation offset 180° from the first orientation such that said locking and release pawl can be located at a top or bottom of said base plate.

4. Steering compartment equipment for boats which are fitted with a tilt type and height adjustable steering wheel, comprising:
    a mobile tilt wheel shaft,
    a fixed control shaft,
    a universal joint which permits offset rotation of the mobile tilt wheel shaft and the fixed control shaft relative to each other,
    a base plate for securement to a dashboard of the boat,
    a gasket arrangement for sealing the base plate and fixed control shaft relative to the dashboard, external coverings which protect the equipment against splashes, waves and bad weather, the external coverings including:
  a first fixed annular covering which protects parts of the equipment which are secured to the dashboard,
  a second mobile annular covering which protects a mobile upper part of the equipment, and
  a third intermediate toroid band shaped seal located between the first fixed annular covering and the second mobile annular covering, the toroid band shaped seal including:
    a lower circular internal recess mounted on a peripheral upper zone portion of the first fixed annular covering, and
    an inwards bent upper shaping which rests on an outside of a lower zone of the second mobile annular covering, the upper shaping being outwardly elastically bendable to facilitate installation of the second mobile annular covering and inwardly elastically bendable to a rest position in sealing relation to he second mobile annular covering.

5. Steering compartment equipment according to claim 4, wherein the toroid band shaped seal includes an annular recess in an inner surface thereof for more easily bending the upper shaping.

6. Steering compartment equipment according to claim 4,
further comprising a locking and release pawl meshing with a sector gear for changing an inclination of the mobile tilt wheel shaft, and
wherein the base plate has an inclined configuration which permits installation in a first orientation and a second orientation offset 180° from the first orientation such that said locking and release pawl can be located at a top or bottom of said base plate.

7. Steering compartment equipment according to claim 4, wherein the universal joint includes:
  stirrups positioned inside the universal joint, and
  a cross journal having articulated shafts with ends that penetrate the stirrups.

8. Steering compartment equipment according to claim 7, wherein the cross journal is formed as a substantially square parallelepiped with chamfered edges to permit inclination of the mobile tilt wheel shaft and the fixed control shaft relative each other.

9. Steering compartment equipment according to claim 7, wherein the universal joint further includes flanged ferrules inserted in the stirrups with the articulated shafts inserted in the flanged ferrules to prevent gripping of the universal joint when not in use.

10. Steering compartment equipment according to claim 4, wherein there are four said identical stirrups positioned inside the universal joint.

11. Steering compartment equipment according to claim 4, wherein the gasket arrangement includes a flanged base gasket for interposition between the base plate and the dashboard of the boat.

12. Steering compartment equipment according to claim 4, wherein the gasket arrangement includes an O-ring mounted on the fixed control shaft at a position where the fixed control shaft passes through the dashboard and which cooperates with the flanged base gasket.

* * * * *